Nov. 29, 1949　　　　R. SHERRY　　　　2,489,679
SAFETY PULLEY
Filed Sept. 25, 1945
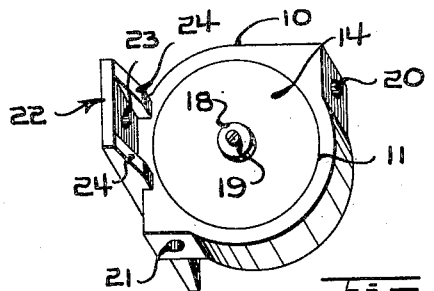
Fig-1-
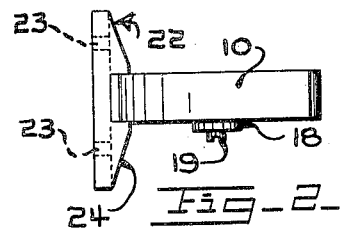
Fig-2-
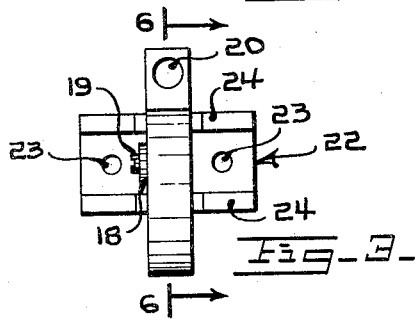
Fig-3-
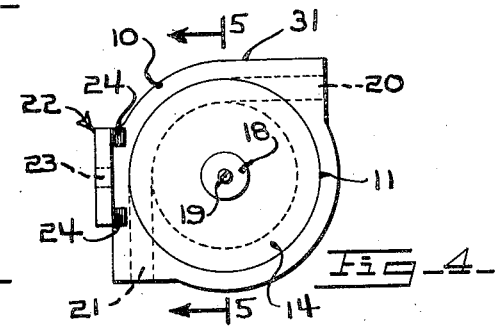
Fig-4-
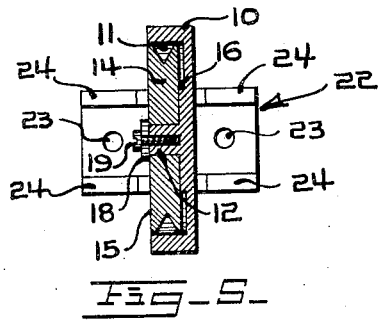
Fig-5-
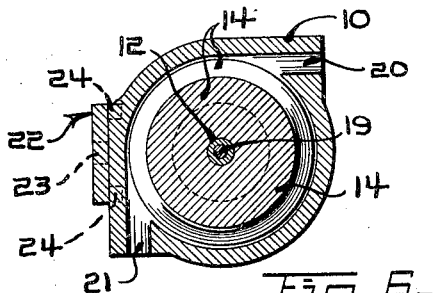
Fig-6-
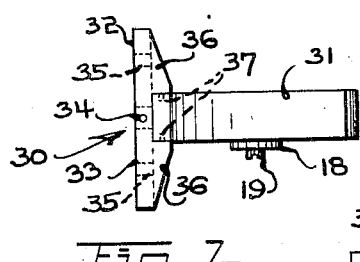
Fig-7-
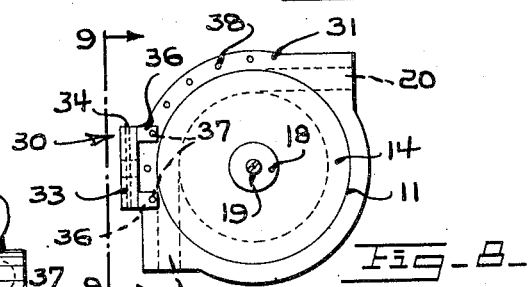
Fig-8-
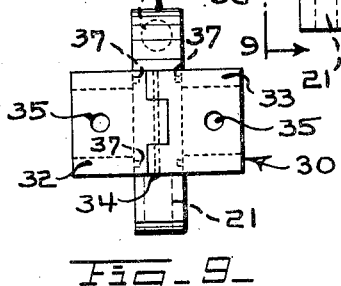
Fig-9-
INVENTOR
ROBERT SHERRY
BY
ATTORNEY Patented Nov. 29, 1949

2,489,679

UNITED STATES PATENT OFFICE 2,489,679

SAFETY PULLEY

Robert Sherry, Far Rockaway, N. Y.

Application September 25, 1945, Serial No. 618,453

6 Claims. (Cl. 254—195)

This invention relates to new and useful improvements in pulleys and has more particular reference to a safety pulley.

The new and improved pulley is characterized by a flat body having a circular opening extending inwards from one face. A stud projects from the base wall of this opening. It is proposed to mount a flat pulley rotatively on said stud in a manner so that its outer face is flush with the face of said flat body and serves to close said opening. It is proposed that the body be formed with passages extending inwards from its edges for a cord or cable to pass over said pulley. The invention contemplates the provision of a transverse support member mounted across the edge portion of said flat body by which said safety pulley may be mounted on various objects. The invention also contemplates a modification in which it is possible to shift the transverse support member to various positions so as to support the flat body in various positions.

Still further the invention proposes an improved safety pulley, as briefly explained, which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a safety pulley constructed in accordance with this invention.

Fig. 2 is a plan view of Fig. 1.

Fig. 3 is a front elevational view of Fig. 1.

Fig. 4 is a side elevational view of Fig. 1.

Fig. 5 is a vertical sectional view taken on the line 5—5 of Fig. 4.

Fig. 6 is a transverse vertical sectional view taken on the line 6—6 of Fig. 3.

Fig. 7 is a plan view similar to Fig. 2 but illustrating a safety pulley constructed in accordance with a modified form of this invention.

Fig. 8 is a side elevational view of the pulley shown in Fig. 7.

Fig. 9 is a back view of the pulley looking in the direction of the line 9—9 of Fig. 8.

The new and improved safety pulley in accordance with the form of the invention illustrated in Figs. 1 to 6, inclusive, includes a substantially flat body 10 having a circular opening 11 extending inwards from one face. A stud 12 projects coaxially of and from the base wall of the opening 11. A flat pulley 14 is rotatively mounted on the stud 12 and has a flat outer face 15 which is flush with the outer face of the flat body 10 and the stud 12 and serves to close the opening 11.

The cable or cord is recessed within the circular opening 11 so that the cable does not protrude beyond the outer periphery of the opening 11, but lies flush or below the inner surface of the body 10 with which it comes in contact.

The flat pulley 14 has an inner face which rests against a shoulder 16 formed upon the base wall of the opening 11. This cuts down the frictional resistance of the pulley so that it may turn easily. A washer 18 and screw 19 serve to releasably support the pulley 14 in position on the stud 12. The flat body 10 is formed with passages 20 and 21 extending inwards from its edges for a cord or cable to pass through, for engaging around the pulley 14.

A transverse support member 22 is mounted across an edge portion of the flat body 10 by which the safety pulley may be conveniently mounted on a flat, or other shaped object. This transverse support member 22 is formed with apertures 23 through which fastening elements may engage. The support member 22 is reinforced with ribs 24 formed along its edge portions.

The operation and use of the new and improved safety pulley may be understood from the following:

The safety pulley is first mounted upon a body by engaging fastening elements through the aperture 23. The cord, or cable is then threaded through the passages 20 and 21 in order to slip it around the pulley 14. The pulley is now ready for use. It is possible, if desired, to arrange these pulleys in pairs, or in series in order to change the direction of the cable or cord from a horizontal to a vertical position, and vice-versa.

In Figs. 7 to 9, inclusive, a modified form of the invention has been disclosed which is very similar to the prior form distinguishing merely in the fact that the pulley is provided with a transverse support member 30 adjusted to positions upon the flat body 31 of the pulley. More specifically, the support member 30 is formed with sections 32 and 33 which are hingedly connected together by a hinge pin 34. These sections 32 and 33 extend to the right and left hand of the flat body 31. The support member 30 has apertures 35 for fastening elements by which it may be attached upon a flat or other object. The support member 30 is also provided with ribs 36 extending along its edge portions. The inner ends of these ribs form shoulders engaging against the faces of the flat body 31. Small pegs 37 project from the inner ends of the ribs 33 and engage certain of a series of apertures 38 extended along the front and back faces of the flat body 31.

The flat body 31 is provided with a circular opening 11 extended inwards from one of its faces. A pulley 14 is rotatively mounted within this opening 11, in the same way as previously explained relative to the first form of the invention.

In other respects this form of the invention is identical to the prior form and like parts may be recognized by the same reference numerals.

The operation and use of this form of the invention is substantially identical to the prior form. However, it distinguishes in the fact that when the safety pulley is mounted upon a flat object, the transverse support member 30 will be in a position in which the pegs 37 engage certain of the apertures 38. When desired, the fastening elements which hold the support member 30 are removed so that the sections 32 and 33 of the member 30 may be bent relative to each other to disengage the pegs 37 from the apertures 38. Now it is possible to move the support member 30 along the edge portion of the flat body 31 to a new position. In a new selected position, the pegs 37 are engaged with different ones of the apertures 38. Now the pulley may be mounted on some object so that the sections 32 and 33 of the support member 30 are located in positions in which the pegs 37 engage the new apertures 38.

A feature of the second form of the invention resides in the fact that the flat body 31 may be adjusted in relation to the support member 30 so that the passages 20 and 21, through which the cord or cable passes, are directed in selected directions.

It is to be understood that the pulley 14 may be rotated on suitable ball bearings or thrust bearings to reduce the amount of friction in the device.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letter Patent is:

1. A safety pulley, comprising a substantially flat body having a circular opening extending inwards from one face, a stud projecting coaxially of and from the base wall of said opening, a flat pulley rotatively mounted on said stud and having a flat outer face flush with the face of said flat body and serving to close said opening, said body having passages extending inwards from its edges for a cord to pass over said pulley, a transverse support member mounted across an edge portion of said flat body, and consisting of right and left hand sections hingedly connected together adjacent the edge portion of said flat body, said support member having shoulders engaging the faces of said flat body when said sections are in a common plane, and pegs projecting from said shoulders and engaging certain of a series of apertures extending along the faces of said flat body, whereby the position of said support member may be changed by engaging said pegs in different groups of said apertures.

2. A safety pulley, comprising a substantially flat body having a circular opening extending inwards from one face, a stud projecting coaxially of and from the base wall of said opening, a flat pulley rotatively mounted on said stud and having a flat outer face flush with the face of said flat body and serving to close said opening, said body having passages extending inwards from its edges for a cord to pass over said pulley, a transverse support member mounted across an edge portion of said flat body, and consisting of right and left hand sections hingedly connected together adjacent the edge portion of said flat body, said support member having shoulders engaging the faces of said flat body when said sections are in a common plane, and pegs projecting from said shoulders and engaging certain of a series of apertures extending along the faces of said flat body, whereby the position of said support member may be changed by engaging said pegs in different groups of apertures, said apertures being extended along the edge portion of said flat body.

3. A safety pulley comprising a substantially flat body, a stud projecting coaxially of and from the base wall of said opening, a flat pulley rotatively mounted on said stud and having a flat outer face flush with the face of said flat body and serving to close said opening, said body having passages extending inwardly from its edges for a cord to pass over said pulley, support means mounted across an edge portion of said flat body, and consisting of hingedly connected sections, said means having shoulders engaging the faces of said flat body when said sections are in a common plane, and further means projecting from said shoulders and engaging certain of a series of apertures extending along the faces of said flat body, whereby the position of said first-mentioned means may be changed by alternate engagement of said second-mentioned means in different groups of said apertures.

4. In a pulley having a flat body rotatively supporting a pulley member and formed with passages offset from each other and through which a cord passes to extend over the pulley, means for adjustably supporting the body to vary the direction of the passages, comprising a support member having separate sections hingedly connected together with their free ends extending beyond opposite sides of the body, ribs formed on the top and bottom edges of the sections of said support member and having their adjacent ends abutting the faces of the body, the faces of the body being formed with spaced apertures, and pegs projecting from the said free ends of said ribs and engaging certain of said apertures, whereby said sections of said support member may be pivoted relative to each other in one direction to disengage said pegs from said apertures freeing the body to be shifted to align different apertures with said pegs after which said sections may be pivoted relative to each other in the opposite direction to engage the pegs with the apertures now aligned therewith.

5. In a pulley having a flat body rotatively supporting a pulley member and formed with passages offset from each other and through which a cord passes to extend over the pulley, means for adjustably supporting the body to vary the direction of the passages, comprising a support member having separate sections hingedly connected together with their free ends extending beyond opposite sides of the body, ribs formed on the top and bottom edges of the sections of said support member and having their adjacent ends abutting the faces of the body, the faces of the body being formed with spaced apertures, and pegs projecting from the said free ends of said ribs and engaging certain of said apertures, whereby said sections of said support member may be pivoted relative to each other in one direction to disengage said pegs from said apertures freeing the body to be shifted to align different apertures with said pegs after which said sections may be pivoted relative to each other in the opposite direction to engage the pegs with the apertures now aligned therewith, said sections of said support member being formed with apertures through which fastening elements can be passed for securing said sections against being pivoted relative to each other.

6. In a pulley having a flat body rotatively supporting a pulley member and formed with passages offset from each other and through which a cord passes to extend over the pulley, means for adjustably supporting the body to vary the direction of the passages, comprising a support member having separate sections hingedly connected together with their free ends extending beyond opposite sides of the body, ribs formed on the top and bottom edges of the sections of said support member and having their adjacent ends abutting the faces of the body, the faces of the body being formed with spaced apertures, and pegs projecting from the said free ends of said ribs and engaging certain of said apertures, whereby said sections of said support member may be pivoted relative to each other in one direction to disengage said pegs from said apertures freeing the body to be shifted to align different apertures with said pegs after which said sections may be pivoted relative to each other in the opposite direction to engage the pegs with the apertures now aligned therewith, the body being substantially circular and said apertures being arranged in aligned pairs and in arcuate lines concentric with the center of the body.

ROBERT SHERRY.

REFERENCES CITED

The following references are of record in the file of this patent:

UNITED STATES PATENTS

| Number | Name | Date |
|---|---|---|
| 125,419 | Straffin | Apr. 9, 1872 |
| 695,381 | Dutton | Mar. 11, 1902 |
| 1,634,772 | Coventry | July 5, 1927 |
| 1,635,145 | Taylor | July 5, 1927 |
| 1,896,266 | White | Feb. 7, 1933 |